June 30, 1970  G. V. LIEFFRING  3,517,694
SWIVEL APPARATUS
Filed June 28, 1967
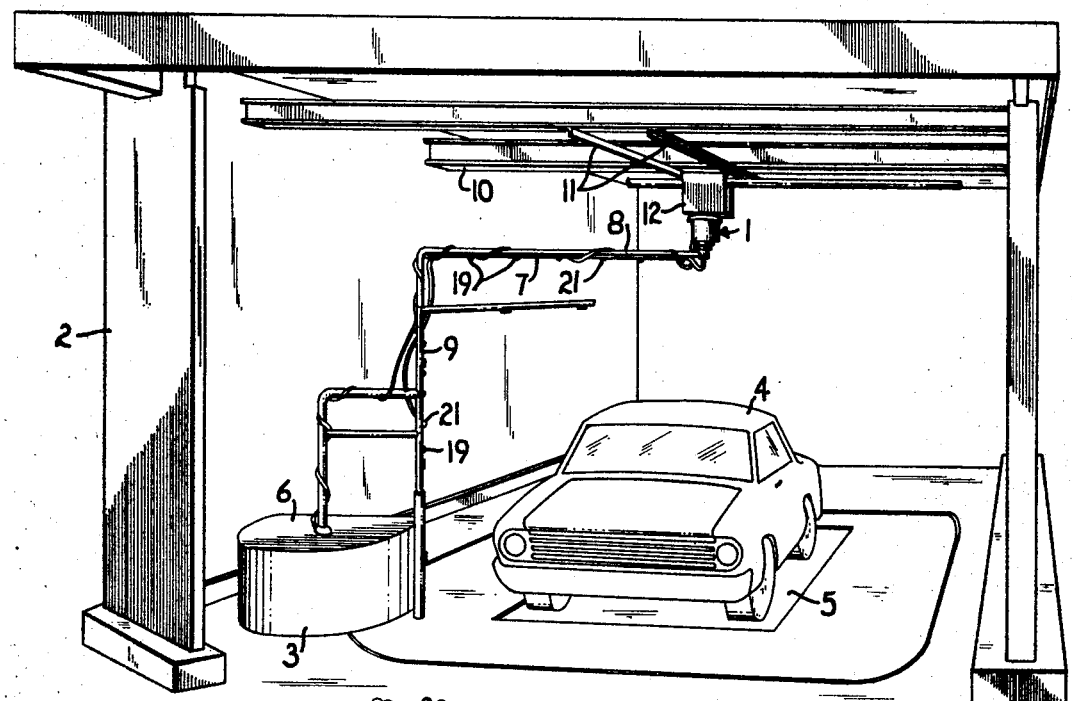
INVENTOR.
GORDON V. LIEFFRING
BY
Fishburn, Gold & Litman
ATTORNEYS

---

United States Patent Office 3,517,694
Patented June 30, 1970

---

3,517,694
SWIVEL APPARATUS
Gordon V. Lieffring, Kansas City, Mo., assignor to Robo-Wash, Inc., Kansas City, Mo., a corporation of Missouri
Filed June 28, 1967, Ser. No. 649,651
Int. Cl. F16l 39/04
U.S. Cl. 137—560                                   6 Claims

ABSTRACT OF THE DISCLOSURE

A swivel apparatus having separate flow paths for conducting separated fluids therethrough from a stationary source to a movable unit connected thereto and including electrical connections for supplying controls and power equipment on the movable unit. The swivel includes stationary pipes or tubes one within the other and with bearing means on the outer pipe rotatably mounting a coupling having one fluid delivery pipe carried thereby and extending therefrom said coupling rotating on the inner pipe with fluid seals between the coupling and both pipes. A second delivery pipe communicates with the inner pipe and rotates with the coupling. An electrical collector ring is carried by the outer pipe and insulated therefrom with a plurality of spaced circuit rings engaged by conductor brushes carried in a housing supported by and rotatable with the coupling.

---

The swivel apparatus is particularly adapted for vehicle washing operations where it is subjected to temperature variations as a mixture of hot water and liquid detergent under high pressure is supplied to a flow passage and then that stopped and a cold rinse water supplied through the same flow passage therethrough. After the rinse another fluid that is kept separate from the regular wash and rinse water is delivered through the swivel to its spray device. This fluid may be a special rinse water of very low mineral content such as in the nature of less than ten (10) parts per millon.

The principal objects of the present invention are: to provide a swivel apparatus having at least two separated fluid passages communicating with respective movable lines leading to respective delivery devices; to provide a swivel apparatus for conducting at least two separated fluids therethrough which has stationary portions with a coupling rotatable on one with seals engaging both, said coupling supporting the delivery lines; to provide such an apparatus which permits electrical power and control signals to be transmitted through the same swivel assembly with at least two fluid lines under pressure; to provide such an apparatus particularly adapted for use in car washing operations which can be easily installed overhead on ceiling beams or the like; to provide such an apparatus which prevents intermingling of the chemicals, mixture of hot water and detergent, or conventional cold water rinse with the special treated water rinse; and to provide such an apparatus which is of simple and rugged construction, durable in use, and economical to manufacture.

Other objects and advantages of this invention will become apparent from the following description taken in connection with the accompanying drawings wherein are set forth by way of illustration and example certain embodiments of this invention.

FIG. 1 is a perspective view of the swivel apparatus embodying the features of the present invention installed in a vehicle washing installation.

FIG. 2 is a fragmentary vertical cross-sectional view through the swivel apparatus on an enlarged scale.

FIG. 3 is an enlarged detail section through the lower end of the swivel apparatus showing the bearing and seal for the tube therein.

Referring more in detail to the drawings.

The reference numeral 1 generally designates a swivel apparatus for multiple fluid flow illustrated for use in car washing operations, the apparatus being installed overhead within a suitable enclosure 2. The swivel apparatus 1 is particularly useful as part of self-service installations where wash spray devices 3 are movable around a vehicle 4 as for example with the vehicle in a wash position 5 spray devices are moved therearound. As shown a mobile carriage 6 moves around the vehicle 4 to carry the spray devices 3. The spray devices include a spray arm 7 which is on the mobile carriage 6 and connected to sources of supply for a programmed cycle in supplying a cleansing fluid for a predetermined cycle and then applying a conventional rinse water to the surfaces for a predetermined cycle followed by applying a special treated water rinse to the car surfaces for a predetermined cycle. The spray arm 7 is shown as an inverted L-shape or the like having a horizontal or upper portion 8 extending over a portion of the top of the vehicle 4 to direct sprays downwardly thereon and a generally upright portion 9 to direct sprays onto the side surfaces of the vehicle 4.

In the illustrated example the swivel apparatus 1 is mounted over the washing position 5 and is suitably secured to ceiling beams 10 of the enclosure 2. In the illustrated structure the apparatus 1 is secured to a pair of spaced-apart angles 11 extending between and suitably secured to the ceiling beams 10.

An open ended junction housing 12 provides axial support for the swivel apparatus 1 and is suitably secured to the pair of spaced apart angles 11. In the illustrated structure a plate-like member 14 is secured to the junction housing 12 and a straight section of pipe 15 extends through the plate-like member 14 and is suitably secured thereto.

The straight section of pipe 15 is adapted to receive and conduct through the swivel apparatus 1 a plurality of fluids by being suitably connected to a special T 16 as by a nipple 17.

In the illustrated structure the T 16 is within the junction housing 12.

A first fluid supplying conductor or pipe 18 is suitably installed in one side of the special T 16. In the illustrated structure the first fluid pipe 18 extends into one side of the junction housing 12 and supplies a suitable cleansing or first fluid such as a mixture of hot soft water and detergent under pressure. The first fluid is preferably such that when directed in high pressure sprays through a plurality of spray nozzles 19 upon all the top and side surfaces of the vehicle 4, soil and film thereon tend to be dissolved and flushed from the surfaces of the vehicle 4.

A second fluid supplying conductor or tube 20 carrying a special rinse water of very low mineral content, such as less than ten (10) parts per million is inserted through the special T 16 so as to be coaxially aligned with the straight section of pipe 15. The second fluid tube 20 is suitably sealed from the first fluid pipe 18 thereby preventing intermingling between the first fluid and the second fluid. In the illustrated example the second fluid is preferably such a cold water rinse that will air dry, spot and streak free, when directed in low velocity sprays through different nozzles such as nozzles 21 on the upper portion 8 and the upright portion 9. The second fluid tube 20 is preferably of stainless steel or other suitable material such as plastic or a lined metal for protection against action of the second fluid due to the low mineral content.

A third fluid pipe 22 supplying a suitable cold water rinse such as cold soft water to be directed in high velocity sprays through the same nozzles 19 as used for the cleansing fluid or first fluid is suitably installed in the other side of the special T 16. In the illustrated example the first fluid pipe 18 and the third fluid pipe 22 communicate with the straight section of pipe 15. If the vehicle 4 is allowed to air dry after the third fluid rinse is completed spots and streaks may remain on the dried surfaces.

In applicant's swivel appearatus 1 the cleansing or first fluid and the rinse water or third fluid is followed by the specially treated low mineral content rinse sprayed through the nozzles 21. The second fluid is directed into a fine low velocity spray onto the vehicle 4 while still wet following the rinse cycle of the third fluid.

One end of a pipe extension 23 is suitably connected to the straight section of pipe 15 to support a swivel coupling 24 and conduct the first and third fluids therethrough and around the second fluid tube 20. A pair of axially spaced ball-bearings 25 are installed in the swivel coupling 24 adjacent one end to rotatably support the swivel coupling 24 on the pipe extension 23. The ball-bearings 25 are preferably of the radial thrust self-aligning type having inner and outer races with a plurality of balls therebetween. The one end of the swivel coupling 24 is suitably sealed to prevent mist produced by spraying operations from entering the swivel coupling 24.

A floating seal 26 provides a continuous sealed passage or conduit for the first and third fluids from the pipe extension 23 into the swivel coupling 24. In the illustrated structure the floating seal 26 is movable with the swivel coupling 24 by suitable key pins installed in the floating seal 26 and engaged in the swivel coupling 24. The pins are axially aligned with the pipe extension 23 and allow axial movement of the floating seal 26. A suitable resilient gasket or seal is coaxially aligned with and placed between the floating seal 26 and an opposite end of the pipe extension 23 to provide a continuous seal and provide for the rotation of the floating seal 26 relative to the stationary pipe extension 23.

A suitable wedge 27 provides a snug fit between an internal surface of the swivel coupling 24 and an external surface of the floating seal 26, thereby providing a seal between the first and third fluids and the bearings 25. The wedge 27 is preferably of "Teflon" or other material having a low coefficient of friction, a substantially zero moisture absorption, toughness, and flexibility.

A suitable resilient member such as a compression spring 28 maintains a fluid tight passageway by urging the floating seal 26 into contact with the opposed end of the pipe extension 23. In the illustrated structure the spring 28 has one end engaged in an opposed end of the swivel coupling 24 and another end engaged with a suitable seal guide which is in contact with the wedge 27, thereby maintaining pressure on the floating seal thus forming a fluid tight seal between the pipe extension 23 and the swivel coupling 24.

A first fluid receiving or delivery pipe 29 is suitably connected to the swivel coupling 24 to deliver the first and third fluids to the nozzles 19. In the illustrated structure the fluid receiving or delivery pipe 29 is installed in a lower portion of the swivel coupling 24 transverse to a longitudinal axis of the straight section of pipe 15 and the pipe extension 23. The pipe 29 is movable with the swivel coupling 24.

A second fluid receiving or delivery tube 30 communicates with the second fluid tube 20 to convey the second fluid to the nozzles 21. In the illustrated structure the second fluid tube 20 extends into an end cap 31 mounted in the opposite end of the swivel coupling 24. The low pressure second fluid is sealed from the high pressure first and third fluids by a plurality of O-rings 28′, snap-rings 29′, and bearings 30′ thereby providing a fluid-tight seal between the first and third fluids and the second fluid receiving tube 30. It is preferable that the end of the second fluid tube 20 extending into the end cap 31 be machined to a smooth surface to provide a smooth surface for the bearings to engage while moving therearound. It is preferable that the bearings 30′ in the end cap 31 be a material having a very low coefficient of friction such as carbon filled "Teflon" or the like.

In order to electrically activate a motor within the mobile carriage 6 one end of an electrical swivel housing 32 is mounted on the swivel coupling 24 for movement around the stationary straight section of pipe 15. An electrical conduit 33 containing a plurality of electrical leads extends into the junction housing 12, through the plate-like member 14, and is connected to a collector ring assembly 34. In the illustrated structure the collector ring assembly 34 is suitably axially supported by a suitable supporting ring 35 which is installed on the opposite end of the straight section of pipe 15. The leads from the electrical conduit 33 are connected to a plurality of axially spaced slip rings in the collector ring assembly 34.

A plurality of resilient electrically conductive brushes 36 slidably engage the respective stationary slip rings in the collector ring assembly 34. The brushes 36 are each electrically connected to the motor in the mobile carriage 6 by a plurality of leads through an electrical conduit 38. In the illustrated structure the brushes 36 are supported in an axial position in a stand 37.

The brushes 36 and the collector ring assembly 34 are protected from the mist produced by the spraying operations by having the opposed end of the electrical swivel housing 32 installed within a hood 39. In the illustrated structure the hood 39 is formed by a ring 40 being secured to the plate-like member 14 and so placed to surround the electrical swivel housing 32. It is preferable that the electrical swivel housing 32 have a snug fit within the ring 40 to protect the electrical parts therein from the mist resulting from the spraying of the various fluids.

What I claim and desire to secure by Letters Patent is:

1. A swivel apparatus for conducting a plurality of fluids therethrough and including:
    (a) an elongate section of straight pipe, said pipe defining a longitudinal axis and a flow passage therethrough for a first fluid,
    (b) an elongate tube in said pipe and extending longitudinally thereof, said tube defining a flow passage therethrough for a second fluid,
    (c) a swivel coupling adjacent a discharge end of said pipe,
    (d) bearing means carried by the pipe and rotatably supporting said swivel coupling, with the interior of the coupling communicating with the pipe for receiving said first fluid therefrom,
    (e) a first flow means connected to said swivel coupling and rotatable therewith, said first flow means communicating with the coupling interior for carrying the first fluid therefrom,
    (f) a second flow means connected to said swivel coupling and rotatable therewith, said second flow means communicating with said tube for carrying the second fluid therefrom,
    (g) seal means engaging the coupling and pipe and the coupling and tube whereby the first fluid passes from the pipe to the first flow means and the second fluid passes from the tube to the second flow means as separate independent flows,
    (h) said seal means engaging said swivel coupling and said pipe comprising:
        (1) a stationary resilient gasket engaging said discharge end of said pipe, said gasket being coaxially aligned with said pipe and said flow passage therein; and
        (2) a floating seal coaxially aligned with and engaging said resilient gasket, said floating seal being adapted to seal said bearing means from said first fluid, said floating seal being mounted within said swivel coupling and movable therewith.
2. The swivel apparatus as set forth in claim 1 including:
    (a) a wedge seal being coaxially aligned with and engaging said floating seal within said swivel coupling, and (b) a resilient member mounted within said swivel coupling, said resilient member urging said wedge seal into engagement with said floating seal and said swivel coupling and urging said floating seal into engagement with said stationary resilient gasket thereby sealing said bearing means from said first fluid.

3. The swivel apparatus as set forth in claim 2 wherein said floating seal comprises:

(a) a body portion having a bore therethrough defining a flow passage for said first fluid, (b) cooperating means engaging said swivel coupling interior and said floating seal, said means preventing rotation of said floating seal relative to said swivel coupling, said means permitting axial movement of said floating seal relative to said swivel coupling.

4. A swivel apparatus for conducting a plurality of fluids therethrough and including:

(a) an elongate section of straight pipe, said pipe defining a longitudinal axis and a flow passage therethrough for a first fluid, (b) an elongate tube in said pipe and extending longitudinally thereof, said tube defining a flow passage therethrough for a second fluid, (c) a swivel coupling adjacent a discharge end of said pipe, (d) bearing means carried by the pipe and rotatably supporting said swivel coupling, with the interior of the coupling communicating with the pipe for receiving said first fluid therefrom, (e) a first flow means connected to said swivel coupling and rotatable therewith, said first flow means communicating with the coupling interior for carrying the first fluid therefrom, (f) a second flow means connected to said swivel coupling and rotatable therewith, said second flow means communicating with said tube for carrying the second fluid therefrom, (g) seal means engaging the coupling and pipe and the coupling and tube whereby the first fluid passes from the pipe to the first flow means and the second fluid passes from the tube to the second flow means as separate independent flows, (h) said seal means engaging said coupling and said tube comprising:

(1) a bushing mounted in said swivel coupling and movable therewith, said bushing having a bore coaxially aligned with and adapted to receive said tube therein, said bore communicating with said second flow means thereby defining a flow passage therethrough for said second fluid;

(2) bearing means mounted in said bore, said bearing means surrounding and engaging said tube; and (3) axially spaced O-rings mounted within said bore, said O-rings being adapted to engage said bushing and said tube therein.

5. A swivel apparatus for conducting a plurality of fluids therethrough and including:

(a) an elongate section of straight pipe, said pipe defining a longitudinal axis and a flow passage therethrough for a first fluid, an inlet fitting fixed to said straight pipe for supplying a first fluid thereto, (b) an elongate tube in said pipe and extending longitudinally thereof, said tube defining a flow passage therethrough for a second fluid, said tube extending through said inlet fitting with the tube inlet adjacent thereto, means fixing said tube relative to said inlet fitting and forming a seal between said tube and inlet fitting, (c) a swivel coupling adjacent a discharge end of said pipe, (d) bearing means carried by the pipe and rotatably supporting said swivel coupling, with the interior of the coupling communicating with the pipe for receiving said first fluid therefrom, (e) a first flow means connected to said swivel coupling and rotatable therewith, said first flow means communicating with the coupling interior for carrying the first fluid therefrom, (f) a second flow connector connected to said swivel coupling and rotatable therewith, said tube extending into said connector and communicating therewith, (g) a second flow means connected to said second flow connector and communicating with said tube for carrying the second fluid therefrom, (h) seal means engaging the coupling and pipe whereby the first fluid passes from the pipe to the first flow means as an independent flow, (i) seal means engaging the said second flow connector and the tube whereby the second fluid contacts only the tube, second flow connector and second flow means in passing through said tube to the second flow means as an independent flow.

6. A swivel apparatus for conducting a plurality of fluids therethrough and electric current to movable apparatus and including:

(a) an overhead support member, (b) a junction housing fixedly mounted on said overhead support member and depending therefrom, said junction housing having an opening therein, (c) an elongate section of straight pipe, said pipe defining a longitudinal axis and a flow passage therethrough for a first fluid, (d) a mounting member fixed to said pipe intermediate its ends, (e) means securing said mounting member to the junction housing with a portion of said pipe extending through the opening therein and another portion of the pipe depending from said mounting member, (f) an elongate tube in said pipe and extending longitudinally thereof, said tube defining a flow passage therethrough for a second fluid, (g) a swivel coupling adjacent a discharge end of said depending portion of said straight pipe, said swivel coupling being spaced from said mounting member, (h) bearing means carried by the pipe and rotatably supporting said swivel coupling, with the interior of the coupling communicating with the pipe for receiving said first fluid therefrom, (i) a first flow means connected to said swivel coupling and rotatable therewith, said first flow means communicating with the coupling interior for carrying the first fluid therefrom, (j) a second flow means connected to said swivel coupling and rotatable therewith, said second flow means communicating with said tube for carrying the second fluid therefrom, (k) seal means engaging the coupling and pipe and the coupling and tube whereby the first fluid passes from the pipe to the first flow means and the second fluid passes from the tube to the second flow means as separate independent flows, (l) an electrical swivel housing supported by said swivel coupling and movable therewith said housing having an upstanding wall extending between the coupling and the junction housing and having a cylindrical upper portion, (m) a hood mounted on said junction housing in covering relation to the swivel housing and having a snug fit with said circular wall portion to protect the interior of the housing from said fluids, (n) a stationary first electrical conductor extending into said electrical housing, (o) a stationary collector ring assembly electrically connected to said first electrical conductor, said collector ring assembly being coaxial with and supported by said straight pipe, (p) a plurality of resilient electrically conductive brushes engaging said collector ring, (q) a second electrical conductor electrically connected to said brushes, said second electrical conductor being supported by said electrical swivel housing and movable with said swivel coupling for carrying current to a movable apparatus.

References Cited

UNITED STATES PATENTS

| | | | |
|---|---|---|---|
| 980,353 | 3/1911 | Smith | 137—580 X |
| 2,693,373 | 11/1954 | Tremolada | 285—134 |
| 2,701,146 | 2/1955 | Warren | 285—134 |
| 3,167,797 | 2/1965 | Hergonson | 134—123 X |

M. CARY NELSON, Primary Examiner

W. R. CLINE, Assistant Examiner

U.S. Cl. X.R.

134—99, 123, 580; 285—134